(12) United States Patent
Amighini et al.

(10) Patent No.: US 8,461,977 B2
(45) Date of Patent: Jun. 11, 2013

(54) DRIVING CIRCUIT FOR AN ELECTRIC LOAD AND ELECTRIC SYSTEM COMPRISING THE CIRCUIT

(75) Inventors: Matteo Amighini, Cremona (IT); Alberto Poma, Pavia (IT); Giuseppe Di Biase, Tromello-PV (IT); Vanni Poletto, Casale Monferrato-AL (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 339 days.

(21) Appl. No.: 12/844,067

(22) Filed: Jul. 27, 2010

(65) Prior Publication Data
US 2011/0025282 A1    Feb. 3, 2011

(30) Foreign Application Priority Data
Jul. 28, 2009   (IT) .................... MI09A1337

(51) Int. Cl.
*B60Q 1/00* (2006.01)
(52) U.S. Cl.
USPC ........ 340/450.2; 340/450; 340/425; 340/435; 324/601

(58) Field of Classification Search
USPC ............... 340/450.2, 450, 425, 435; 324/601
See application file for complete search history.

(56) References Cited

U.S. PATENT DOCUMENTS

| | | | | |
|---|---|---|---|---|
| 5,245,526 A | * | 9/1993 | Balakrishnan et al. | 363/97 |
| 5,404,053 A | * | 4/1995 | Poma et al. | 327/108 |
| 5,828,245 A | * | 10/1998 | Brambilla et al. | 327/108 |
| 5,912,617 A | * | 6/1999 | Poletto et al. | 340/450.2 |
| 6,054,874 A | * | 4/2000 | Sculley et al. | 326/83 |
| 2005/0127883 A1 | | 6/2005 | Hoshino et al. | 323/274 |
| 2009/0115390 A1 | | 5/2009 | Chen et al. | 323/283 |

FOREIGN PATENT DOCUMENTS
EP    1178591    2/2002

* cited by examiner

*Primary Examiner* — Bao Q Vu
(74) *Attorney, Agent, or Firm* — Allen, Dyer, Doppelt, Milbrath & Gilchrist, P.A.

(57) ABSTRACT

An electronic circuit includes a node coupled to a load to be driven, and a power device, which can be switched between activation and deactivation and coupled to the node. The circuit further includes a current generator having an output connected to the node and that can be enabled to generate current at least when the power device is deactivated. The circuit also includes a comparator for comparing an electric voltage of the node with a reference voltage and is configured to generate a comparison signal based thereon.

32 Claims, 7 Drawing Sheets

DRIVING CIRCUIT FOR AN ELECTRIC LOAD AND ELECTRIC SYSTEM COMPRISING THE CIRCUIT

FIELD OF THE INVENTION

The present invention relates to a driving circuit for electric loads, such as, for example, inductive loads. In particular, the present invention relates to a method for detecting an incorrect load connection condition.

BACKGROUND OF THE INVENTION

Electric supply systems are known in the automotive field, which may include several components, such as, for example: alternators, voltage regulators, rectifier diode bridges, and a battery. An alternator, which converts mechanical energy into electric power, includes a rotor, equipped with a coil and three stators, equipped with other coils. The rotor coil is energized with an electric current from a power transistor, and the electric power generated by the alternator is supplied by the rectifier bridge to electric loads of the motor vehicle, or it is used to restore the charge status of the battery. In driving other inductive-type loads (for example, the throttle motor) of a motor vehicle, the use of an H-bridge circuit is known.

In such a type of driving, an undesired condition can occur, wherein the load coil is incorrectly connected to the relative driving circuit, or it even separates therefrom, compromising the charge of the battery or the load supply to the motor vehicle. Such a condition, which is called "open load" condition, corresponds to a situation wherein the electrical current concerning that coil is null or much lower than the one normally present.

Two diagnostic methods for determining open load condition are known. According to a first method, the detection of the open load condition is carried out by directly measuring the current concerning the load, employing a sensing resistor and an operational amplifier. According to another indirect measuring method, an estimation of the current in the load is carried out by employing a current mirror and an additional driving circuit, which is a copy of the one actually driving the load. Prior art methods for detecting the incorrectly connected load condition are generally not satisfactory because of additional leakage introduced in the circuit and the circuit complexity required for their implementation.

SUMMARY OF THE INVENTION

It is the object of the present invention to provide a driving circuit for an electric load, which enables a detection of the incorrectly connected load condition, that is sufficiently accurate and not detrimental in terms of circuit complexity and/or leakage. The object of the present invention is reached by a driving circuit as defined in the appended claims. It is a further object of the invention to provide an electric system comprising a load and a driving circuit.

BRIEF DESCRIPTION OF THE DRAWINGS

Further characteristics and advantages of the invention will be evident from the following description of a preferred embodiment and variants thereof provided as a way of example, with reference to the accompanying drawings, wherein.

DETAILED DESCRIPTION OF THE PREFERRED EMBODIMENTS

Figure 1:
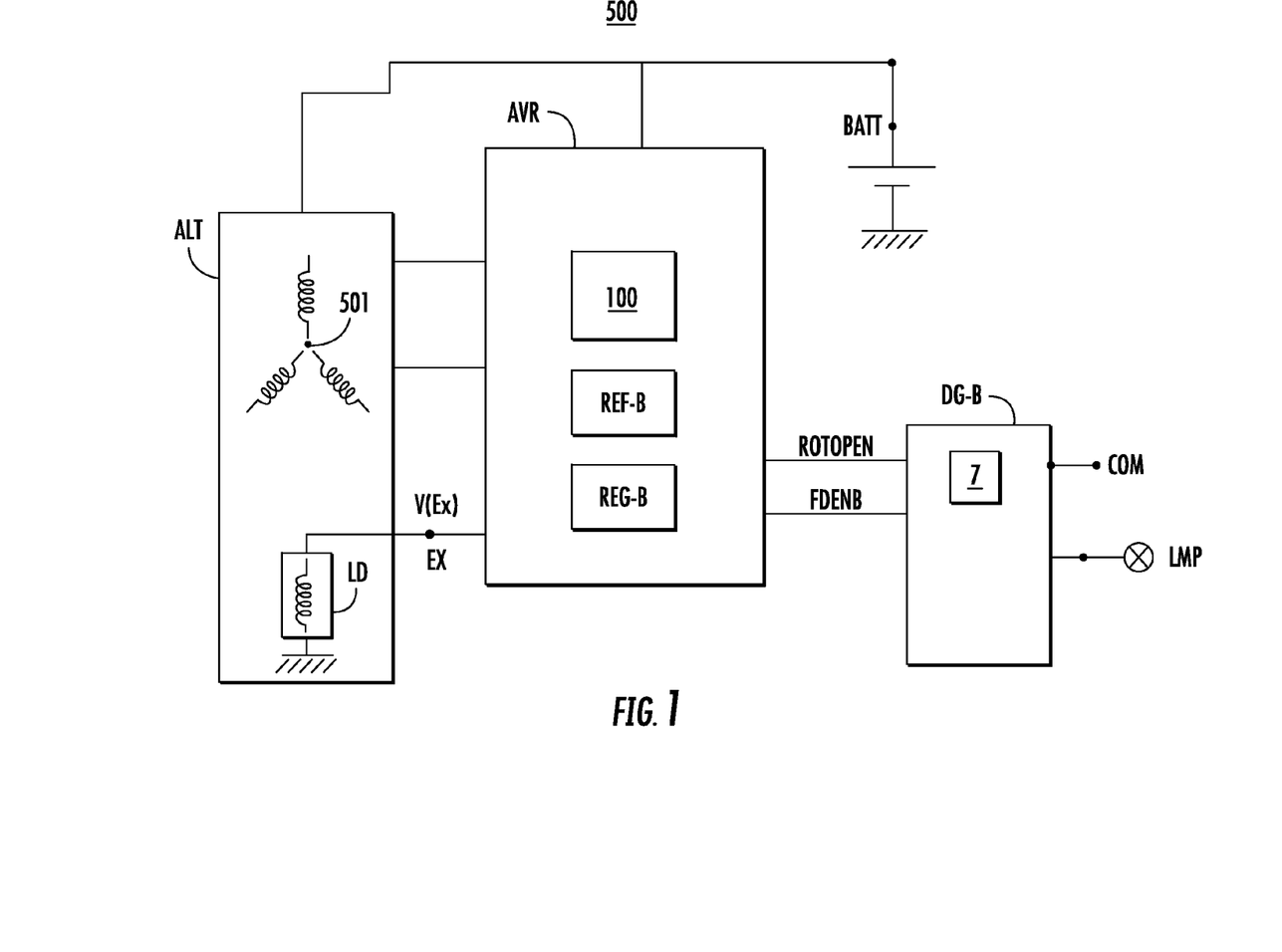
FIG. 1 is a schematic diagram of an exemplary power supply system including a driving circuit and an alternator in accordance with the present invention.

FIG. 1 schematically illustrates an example of a supply system 500, for example, for motor vehicles, which comprises an alternator ALT, an alternator voltage regulator AVR, a battery BATT, and a logic block DG-B. An electric load LD is connected at one end to the node EX of the voltage regulator AVR. The electric load LD has another end connected to a ground terminal GND. According to an example, the load LD is a coil of an alternator rotor ALT, which is connected, by a pulley (not shown) to the motor vehicle engine. The alternator ALT includes three stator coils 501 in a tri-phase arrangement, for example.

The battery BATT is capable of providing a voltage V(BPLUS), and other electric loads of the motor vehicle can be connected thereto, such as, for example, a starter, the motor vehicle rear-window defroster resistors, a headlight, or the like. The voltage regulator AVR comprises a driving circuit 100 for the rotor coil LD, a reference-voltage generating circuit REF-G, a voltage regulating block REG-B, and other blocks, not shown since they are known to those skilled in the art, such as, for example, voltage comparators and a charge-pump circuit.

The logic block DG-B is such that it can send suitable signals to the voltage regulator AVR to implement a suitable regulation strategy. Such a logic block DG-B includes an input COM for driving signals from, for example, a control panel (not shown) of the motor vehicle, such as, typically, an Electronic Control Unit (ECU).

Moreover, the logic block DG-B includes an output line for an anomaly detection signal to cause, for example, a lamp LMP to light on the motor vehicle dashboard.

In operating the supply system 500, the alternator ALT transforms the mechanical energy of the motor vehicle main engine into recharging electric power for the battery BATT. The voltage regulator AVR provides suitable voltage values and exciting current for the rotor coil LD to enable the battery BATT to be charged.

Advantageously, the supply system 500 enables detection of conditions where the load LD is not correctly connected to the node EX. This condition, referred to hereinafter also as an "open load" condition, can correspond, in practice, to a fault of the rotor, on which the load LD coil is mounted, or to a degrading or detachment of the electric connection of load LD to node EX.

Figure 2:
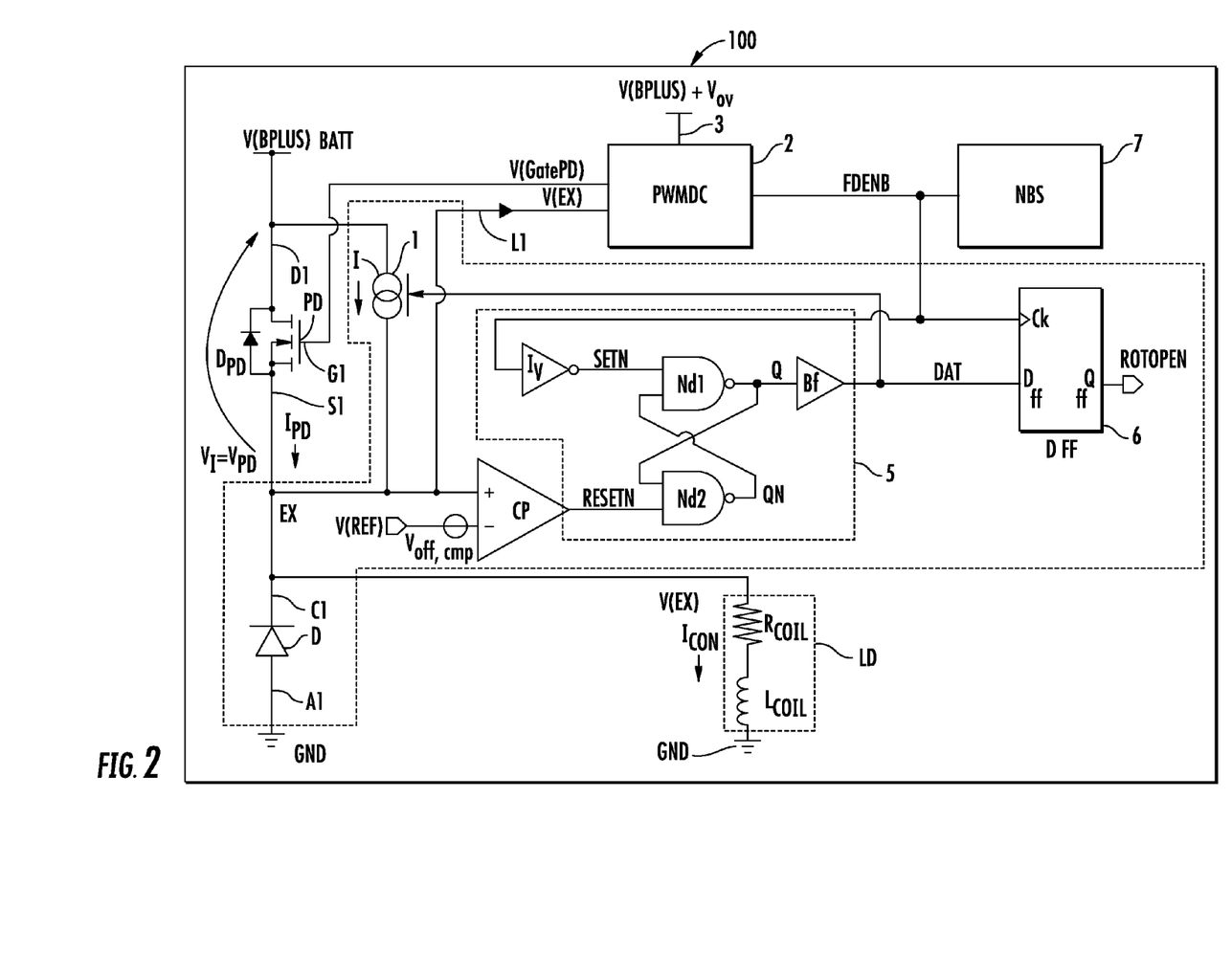
FIG. 2 is a schematic diagram of an embodiment of the driving circuit of FIG. 1.

Referring now to FIG. 2, a first embodiment of the driving circuit 100 of the rotor coil LD is illustrated. The driving circuit 100 comprises a switchable power electronic device PD, and a diagnostics block 300 including a current generator I and a voltage comparator CP. Preferably, the detection block 300 also includes an electronic device D, such as, for example, a diode.

The load LD rotor coil, outside the driving circuit 100, is schematically depicted by a resistor $R_{coil}$ in series with an inductor $L_{coil}$. The resistor $R_{coil}$ has a first terminal connected to the node EX and another terminal connected to a terminal of the inductor $L_{coil}$ having a second terminal connected to the ground terminal GND.

The switchable power electronic device PD is, according to the example in FIG. 2, a power transistor and, in particular, a Metal Oxide Semiconductor Field Effect Transistor (MOSFET). The specific transistor PD shown in FIG. 2 is of the enrichment channel n type, and comprises a gate terminal G1, a source terminal S1 connected to a node EX, and a drain terminal D1 connected to a terminal of battery BATT, which provides a supply voltage (VBPLUS). According to a particular embodiment, the transistor PD is a channel n Diffusion Metal Oxide Semiconductor (DMOS) type power transistor.

A relative parasitic diode $D_{PD}$ is associated with the power transistor PD and connected between the source S1 and the drain D1. In particular, the transistor PD can be deactivated (i.e. switched OFF) bringing an electric potential difference between the gate G1 and source S1 terminals to zero.

As illustrated in FIG. 2, according to this example, the power transistor PD is in the high-side configuration, and, therefore, it is connected between the battery BATT terminal and the first load terminal LD, whereas the second load terminal LD is permanently connected to the ground terminal GND. Alternatively, the power transistor PD can be connected to the load LD in a low-side configuration.

According to the present example, the power transistor PD switches, i.e. it carries out transitions from conduction (active) to interdiction (inactive) with a PWM (Pulse Width Modulation) control. This enables changing of the intensity of the current concerning the load LD.

The driving circuit 100 includes a driving controller 2 (PWMDC), capable of providing a driving voltage (V(GatePD)), and which operates, according to the example, in PWM mode. In particular, the driving voltage V(GatePD) is provided via a first output electric line connected to the gate terminal G1 of the power transistor PD. Moreover, the driving controller 2, because of a connection line L1, measures an exciting voltage (V(EX)) present in the node EX to properly compute the driving voltage V(GatePD) values for the desired regulation strategy.

The driving controller 2 is connected to a supply terminal 3, to which the supply voltage V(BPLUS) is provided and, for example, an overvoltage $V_{ov}$, which provides the correct driving of the power transistor PD in the saturation zone. The driving circuit 2 is driven by a driving enabling signal FDENB generated by a numerical control module 7 (NBS), preferably included in the logic block DG-B, indicated in FIG. 1.

For example, the driving enabling signal FDENB can assume a high logic value and a low logic value, which cause the driving controller 2 to generate a high or low value of the driving voltage (V(GateP)), respectively. In particular, the driving enabling signal FDENB is a pulse width modulation (PWM) signal with a fixed frequency $F_{EX}$ and a variable duty cycle according to a control strategy. As it is known, the duty cycle is the relationship between the duration of the "high" signal and the total period of the signal, and it serves to express the extent of the portion of the period when the signal is at a high level (by high it is meant the "active" level).

Referring now to the detection block 300, the current generator I is connected between the node EX and the battery BATT, and it is, for example, a digitally controlled current generator comprising a control terminal 1 for receiving a control digital signal DAT. For example, the current generator I can be enabled to generate the current at least when the power transistor PD is deactivated. In particular, the current generator I is enabled to work with a high level control digital signal DAT (DAT=1), and it is disabled when such a signal assumes a low level (DAT=0).

According to the embodiment in FIG. 2, the electronic device D is a p-n junction diode, having an anode Ad connected to the ground terminal, and a catode Cd connected to node EX. Diode D switches between interdiction and conduction, according to the voltage taken from node EX.

The voltage comparator CP, which is provided with a non-inverting terminal "+" connected to a node EX and an inverting terminal "−", to receive a reference voltage V(REF) and having an off-set voltage $V_{off,comp}$. The voltage comparator CP further comprises an output for the comparison signal RESETN, which can switch between a high and a low level, according to the result of the comparison of the exciting voltage V(EX) to the reference voltage V(REF). In particular, when the exciting voltage V(EX) is lower than the reference voltage V(REF), the comparison signal RESETN assumes a low value. The voltage comparator CP can comprise, for example, an operational amplifier, and it can be of a type known per se to those skilled in the art.

Moreover, the diagnostics block 300 is provided with an asynchronous sequential logic memory device 5, such as, in particular, a latch. The particular latch 5 illustrated is an SR-type, and it includes two NAND gates: a first gate Nd1 with an output Q and a second gate Nd2 with a denied output QN. The second gate Nd2 receives the input comparison signal RESETN and the output Q. The first gate Nd1 receives as an input, the denied output QN, and is connected to an inverting buffer Iv, which provides an inversion signal SETN. The output Q of the first gate Nd1 is connected to a non-inverting buffer Bf, whose output, which provides the control digital signal DAT is, in turn, connected to an input of the inverting buffer Iv. The latch 5 combines the comparison signal RESETN with the driving enabling signal FDENB resulting in the control digital signal DAT.

The diagnostics block 300 also includes a synchronous memory device 6, such as a D-type flip-flop, for example, having a synchronizing input Ck and an input $D_{f}$ to receive the control digital signal DAT. An output $Q_{f}$ of flip-flop 6 provides a detection signal ROTOPEN of a logic level switchable between two values to be indicative of an opening occurrence, i.e. of an incorrect connection condition of the load LD to node EX. For example, as it will be explained below, a detection signal ROTOPEN, which remains at a high logic value, is indicative of an incorrect connection of the load LD. According to this example, the detection signal ROTOPEN corresponds to the control digital signal DAT, as acquired by the flip-flop 6.

It is observed that, according to the example shown, the driving enabling signal FDENB synchronizes the flip-flop 6, since it concerns the synchronizing input Ck. Alternatively, the flip-flop 6 can be timed by a different signal, also at the frequency $F_{EX}$ or with a frequency multiple of $F_{EX}$. In the following, an example of the operation of the driving circuit 100 in two different operational conditions will be de disclosed: a condition of a correctly connected load LD and one of an incorrectly connected load LD to node EX.

Figure 3:
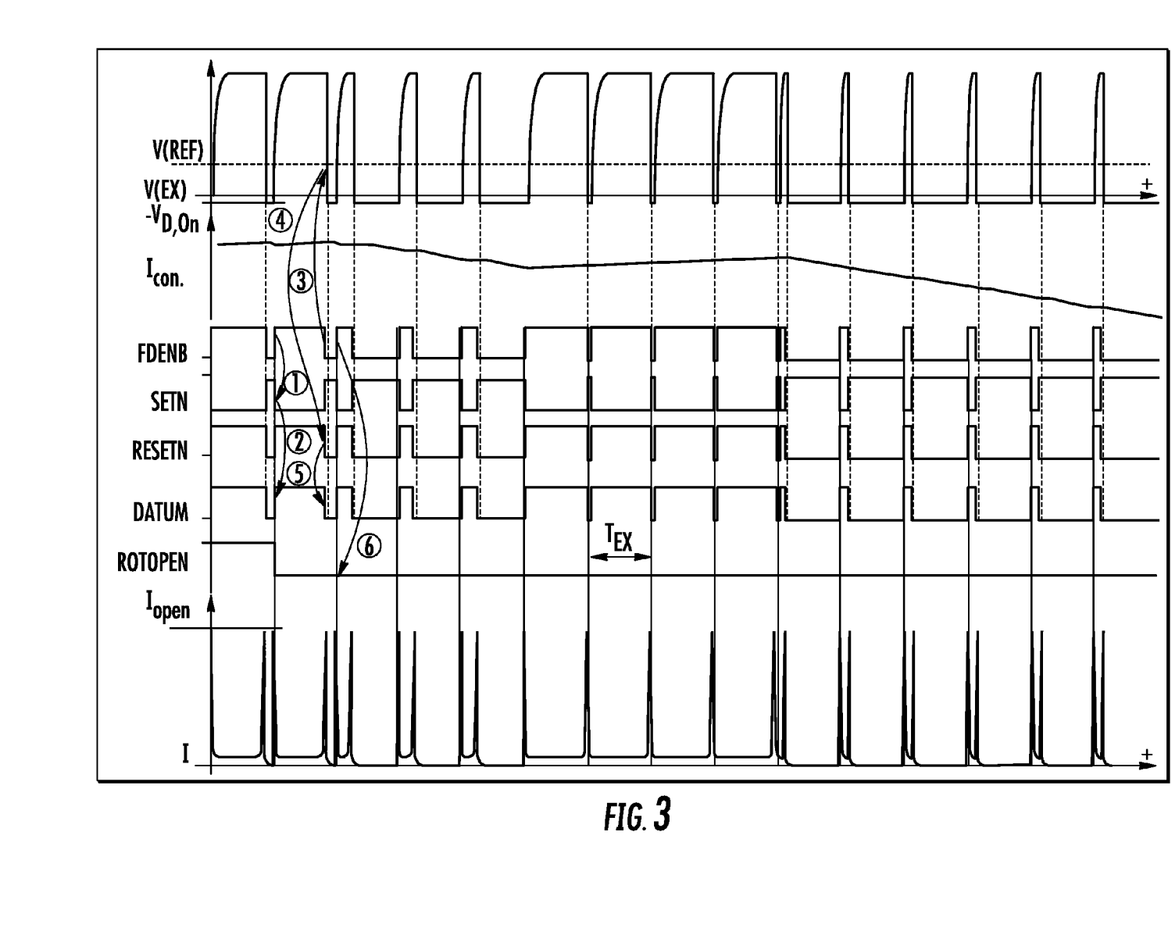
FIG. 3 is a graph voltages, electric currents, and digital signals of the driving circuit of FIG. 2 in a condition where the load is correctly connected.

Referring to FIG. 3, a graph shows the trend of voltages, currents and digital signals of the condition when the load LD is correctly connected to the first node EX. Initially, the detection signal ROTOPEN is placed at a high level (for example, equal to 1). A rising edge of the driving enabling signal FDENB causes the inverting buffer Iv to return a falling edge of the inversion signal SETN (arrow 1, FIG. 3). In such an event, the power transistor PD is active, and the inductor $L_{coil}$ of load LD absorbs an electric exciting current $I_{coil}$.

The falling edge of the inversion signal SETN causes the latch 5 to produce a high level control digital signal DAT (arrow 2, in FIG. 3), considering that the comparison signal RESETN is initially at a high level. Such a high level of the control digital signal DAT causes the current generator I to switch on, which generates a current $I_{open}$.

The subsequent falling edge of the driving enabling signal FDENB causes the driving controller 2 to set a driving voltage V(GatePD) to deactivate (i.e. switch off) the power transistor PD. Since the load LD is correctly connected to the node EX, the exciting electric current accumulated therein will not reach zero immediately, but it will circulate within a mesh, which comprises the load LD, node EX, the diode D and the ground terminal GND. In such a situation, diode D is conductive.

This implies that the exciting voltage V(EX) at node EX decreases, passing through (i.e. dropping below) the reference voltage V(REF) applied to the comparator CP (arrow 3, FIG. 3). The exciting voltage V(EX) crossing the reference voltage V(REF) downwards to node EX causes the comparison signal RESETN to switch downwards, presenting a falling edge (arrow 4, FIG. 3).

The falling edge of the comparison signal RESETN causes the latch 5 to produce a low level control digital signal DAT (arrow 5, FIG. 3). This results in (DAT=0) the current generator I being disabled by the current generation. The subsequent raising edge (arrow 6, FIG. 3) of the driving enabling signal FDENB causes the flip-flop 6 to acquire the level switch of the control digital signal DAT (towards the low level) causing the flip-flop 6 to switch, which produces a low level detection signal ROTOPEN (=0), already indicative of load LD correctly connected to node EX.

In fact, the reading by the logic block DG-B (FIG. 1) of the value assumed by the detection signal ROTOPEN is carried out, however, at each edge (for example, raising edge) of the driving enabling signal FDENB (arrow 6, FIG. 3). In particular, the decision of lighting the lamp LMP, as a consequence of the detection of condition ROTOPEN=1, is made by the logic block DG-B, preferably, after a confirmation time $T_{CONF}$ assessed according to the change from 0 to 1 of the ROTOPEN signal itself.

According to the example disclosed, flip-flop 6 is timed with an acquisition frequency $F_{EX}$, to which a pulse width timing corresponds of $T_{EX}$: $F_{EX}=(T_{EX})^{-1}$. The confirmation time $T_{CONF}$ is a multiple of a duration of the timing pulse of $T_{EX}$. Therefore, according to the described event, a low level of detection signal ROTOPEN is read (however the detection signal ROTOPEN does not remain at value 1 for a longer period than the confirmation time $T_{CONF}$), and it may not be necessary to light the lamp LMP in FIG. 1.

Incorrectly Connected Load LD

Figure 4:
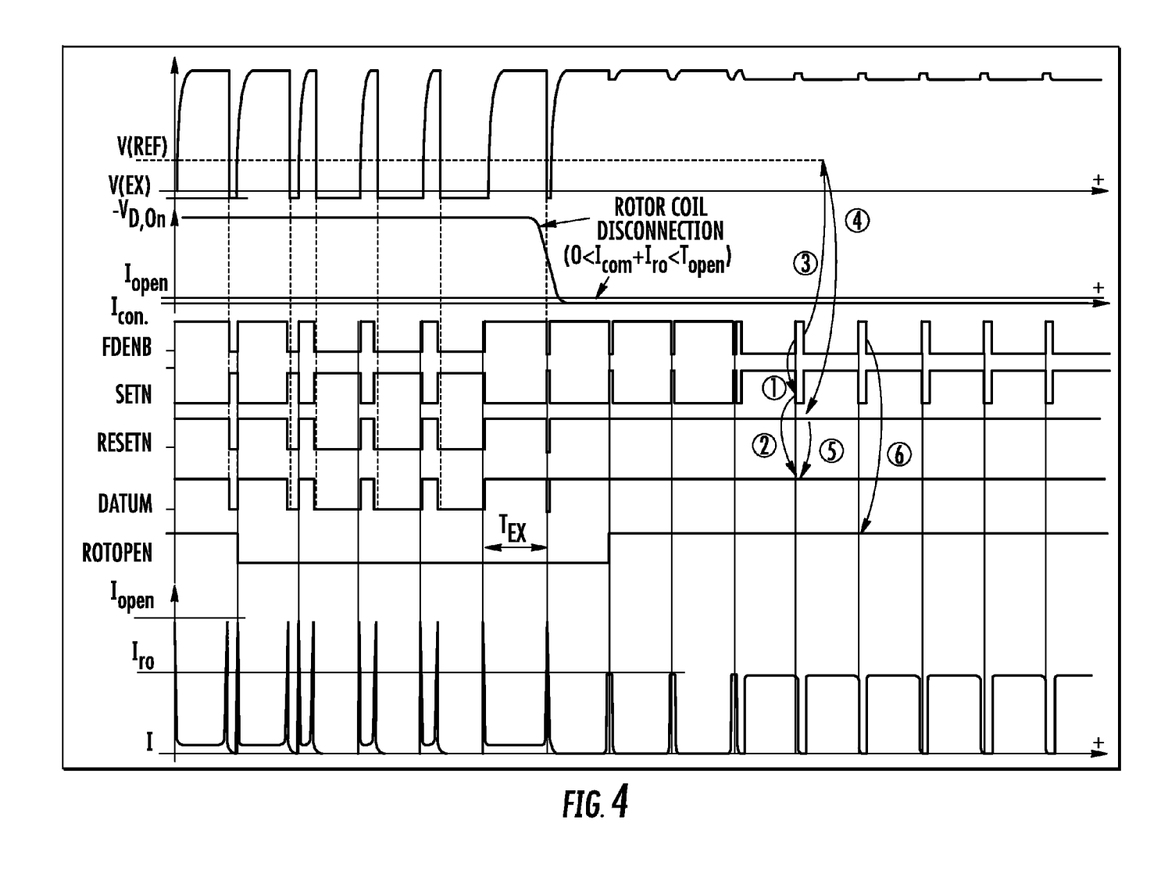
FIG. 4 is a graph of voltages, electric currents, and digital signals of the driving circuit of FIG. 2 in a condition when the load is incorrectly connected.

Referring to the graph of FIG. 4 the operation of the driving circuit 100 under a condition wherein the load LD is not correctly connected to the node EX is disclosed. We start from an analogous condition to the previous one.

Initially, the detection signal ROTOPEN is placed at a high level. A rising edge of the driving enabling signal FDENB causes the inverting buffer Iv to return a falling edge of the inversion signal SETN (arrow 1, FIG. 4). In such an event, the power transistor PD is active, and the inductor $L_{coil}$ of load LD absorbs electric current $I_{coil}$.

The falling edge of the inversion signal SETN causes the latch 5 to produce a high level control digital signal DAT (arrow 2, in FIG. 3). Such a high level of the control digital signal DAT keeps the current generator I enabled. The subsequent falling edge of the driving enabling signal FDENB, through the first voltage signal V(GatePD), deactivates the power transistor PD, bringing the potential difference between gate G1 and source S1 to zero.

Since the load LD is not correctly connected to node EX, it has an electric current for example, equal to or lower than current $I_{open}$ generated by the current generator I. In such an event, such a current of the load LD is absorbed by the current generator I itself, and then the diode D branch, also connected to node EX does not have any current. In other words, diode D is inversely polarized. Therefore, voltage V(EX) at node EX does not drop and does not become lower than the reference voltage V(REF) (arrow 3, FIG. 4).

The voltage V(EX) not crossing the reference voltage V(REF) downwards to node EX causes the comparison signal RESETN not to switch and stay at a high level (arrow 4, FIG. 4) in particular, for more pulses or frames of the driving enabling signal FDENB. The comparison signal RESETN staying at a high level causes the latch 5 to produce a control digital signal DAT, which remains at a high level (arrow 5, FIG. 4), keeping the current generator I enabled.

A subsequent rising edge of the driving enabling signal FDENB causes the flip-flop 6 to acquire the level of the control digital signal DAT keeping a high level detection signal ROTOPEN. Therefore, also after the already defined confirmation time $T_{CONF}$, the detection signal ROTOPEN is reconfirmed at a high level, resulting in an indication of a load LD incorrectly connected to the first node EX. In such an event, the detection signal ROTOPEN provided to the logic block DG-B causes the latter to drive the lighting of the lamp LMP, to alert the user that an anomalous situation occurred.

The current generator I, which subtracts current to diode D, allows setting of a detection threshold of the correct or incorrect connection of the load LD condition. In fact, according to the example, if the current in the load LD is higher than or equal to $I_{open}$, a correct connection condition is detected. On the other hand, in case of a lower current than $I_{open}$ in the load LD, an incorrect connection condition is detected. By adjusting the current $I_{open}$, such a threshold can be moved according to specific requirements. The described example referred to a situation wherein the PWM voltage signal V(GatePD) has a duty cycle DC or full-empty ratio lower than 100%.

According to another possible embodiment, the numerical stage 7 adopts a regulation strategy according to which the driving controller 2 should generate a first PWM voltage signal V(GatePD), which has a duty cycle DC or full-empty ratio equal to 100%. In such an event, current $I_{coil}$, which involves the load LD, would flow for the entire duration $T_{EX}$ of the pulse of driving enabling signal FDENB, and such a condition can be kept on a plurality of pulses of signal FDENB itself.

Such an event (DC=100%) may make it impossible to detect the incorrectly connected load condition, should this occur exactly during a series of pulses with a duty cycle DC=100%. In case the flip-flop 6 was timed with a frequency $F_{EX}$ or multiples thereof, the presence of consecutive high level pulses of the driving enabling signal FDENB could cause a false detection of the incorrectly connected load condition, since such a flip flop 6 would acquire the possible change level (from 1 to 0) of the detection signal ROTOPEN for a time equal to or higher than the confirmation time $T_{CONF}$.

Figure 5:
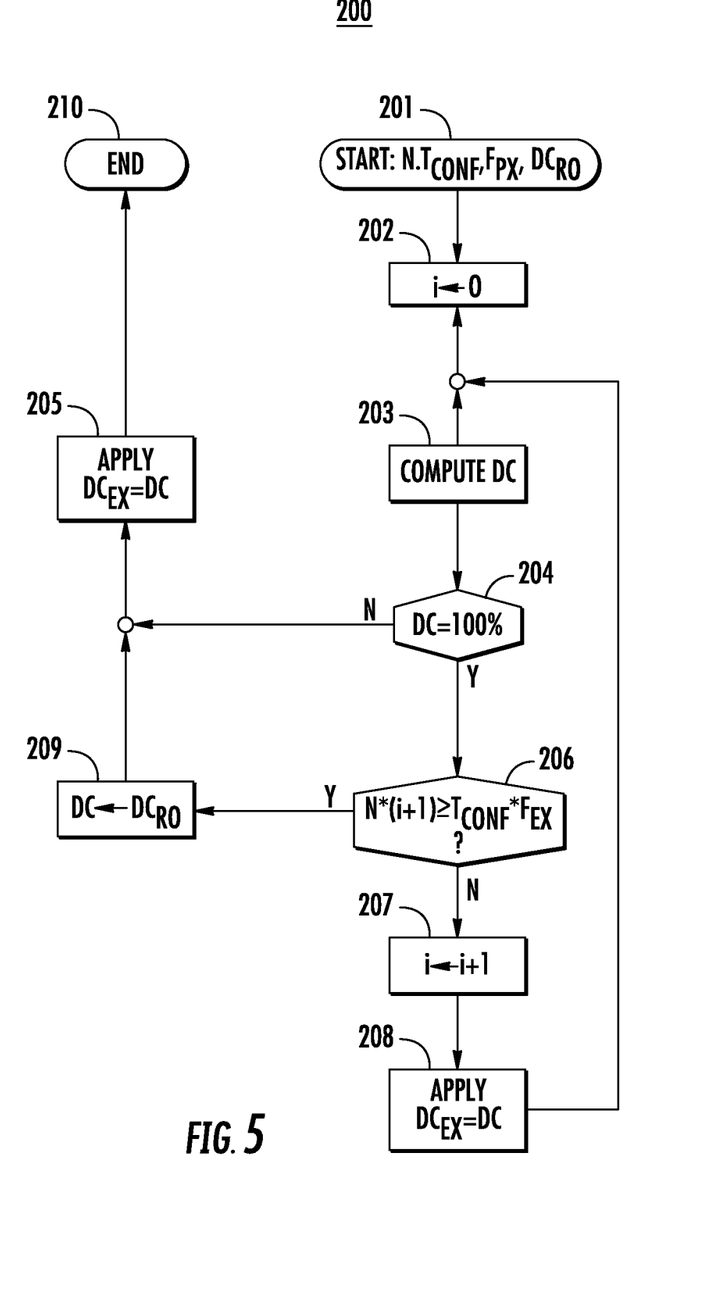
FIG. 5 is a flow chart illustrating an operating method of the system of FIG. 1.

Advantageously, these problems are addressed by employing a method that can be implemented by the numerical block 7, on which an example is disclosed below with reference to FIG. 5, which illustrates a flowchart 200. According to the method 200, in an initial step 201 (START) the following magnitudes are defined:

a preset integer number N;

the confirmation time $T_{CONF}$;

frequency $F_{EX}$ and duration $T_{EX}$ of the driving enabling signal FDENB and i.e. the synchronizing signal of flip-flop 6 and the driving controller 2 command; and pre-selected value for the duty cycle $DC_{RO}$.

In an initializing step 202, an iteration index is set equal to zero 0, and in a computing step 203, the duty cycle Dc is evaluated, which would be imposed by the adjusting strategy. In a verification step 204, it is verified whether the evaluated value of the duty cycle DC is equal to or lower than 100%.

In case such a value of the duty cycle is lower than 100% (arm N in FIG. 5), the method 200 includes a setting step 205, wherein the evaluated value DC is selected as the duty cycle to be applied $DC_{EX}$. In case, from the verification step 204, the value of the evaluated duty cycle DC is equal to 100% (arm Y, step 204), it proceeds to a decision step 206. In this decision step 206, the elapsed time, expressed as the product of the integer N multiplied by the number of iterations, is compared to a portion of the confirmation time $T_{CONF}$ evaluated in respect to the duration $1/F_{EX}$ of the driving enabling signal FDENB.

If this elapsed time equal to N(i+1) is not higher than or equal to (branch N, step 206) the result between the confirmation time $T_{CONF}$ and the frequency $F_{EX}$ of the driving enabling signal FDENB, then the index i+1 is set as the index I (step 207), and the described detection method proceeds by employing, in a step 208, the evaluated value DC of the duty cycle. Moreover, it proceeds with an iteration, which starts again from the step of calculating the duty cycle 203.

In an iteration (branch Y in step 206) wherein the number N(i+1) is higher than or equal to the product between the confirmation time $T_{CONF}$ and the frequency $F_{Ex}$, it proceeds to a resetting step 209. In this step 209, the maximum preset value of the duty cycle $DC_{RO}$ is imposed, which results proximate to the full duty cycle of 100%, but lower than this, which is then applied until the end 210 (END) of the detection method.

According to an example, the value of the preset duty cycle is 97%. According to the disclosed method, the number of frames (or pulses) of the driving enabling signal. FDENB, above which the preset duty cycle $DC_{RO}$ is applied, and is given by the following expression:

$$[0,5+(T_{CONF}*F_{EX}-N)/N]$$

wherein the function [x] represents the highest integer which does not exceed x. Such a method 200 introduces a falling edge of the driving enabling signal FDENB every $T_{CONF}/N$ and the signal FDENB itself remains at a low level (glitch) for a time equal to $(1-0,01*DC_{RO})/F_{EX}$.

In the following, with reference to FIGS. 6 and 7, an example of a mode for selecting the reference voltage V(REF) will be disclosed. FIG. 7 shows a circuit equivalent to the driving circuit 100 in the configuration wherein: the power transistor PD is deactivated and has a relative parasitic diode $D_{PD}$, and the current generator I is enabled (DAT=1) and it has a parasitic diode $D_I$. The parallel of parasitic diodes $D_{PD}$ and $D_I$ associated with the current generator I and with the power transistor PD forms an electronic component having a relative threshold voltage denoted by $V_{Dx,on}$, while a threshold voltage of diode D is denoted by $V_{D,on}$. An output resistance of a large signal is associated with the current generator and denoted by $R_{I,out}$.

For example, consider the event when the current generator I is implemented through an integrated circuit including an output transistor, which requires a minimum voltage $V_{I,min}$ to operate in the saturation region. In such an event, the current generator I exits the disabling region when a voltage at its ends $V_I$ (equal to voltage V(PD) at the ends of the power transistor) exceeds such a minimum voltage $V_{I,min}$.

Hence, imposing the restriction above, related to the current generator I, the reference voltage V(REF) for the comparator CP fulfils the following relation:

$$0<V(REF)<=V(REF,max)=V(BPUS)-V_{I,min},V_{off,cmp}$$

wherein the voltage $V_{off,cmp}$ is the offset voltage of the comparator CP.

Figure 6:
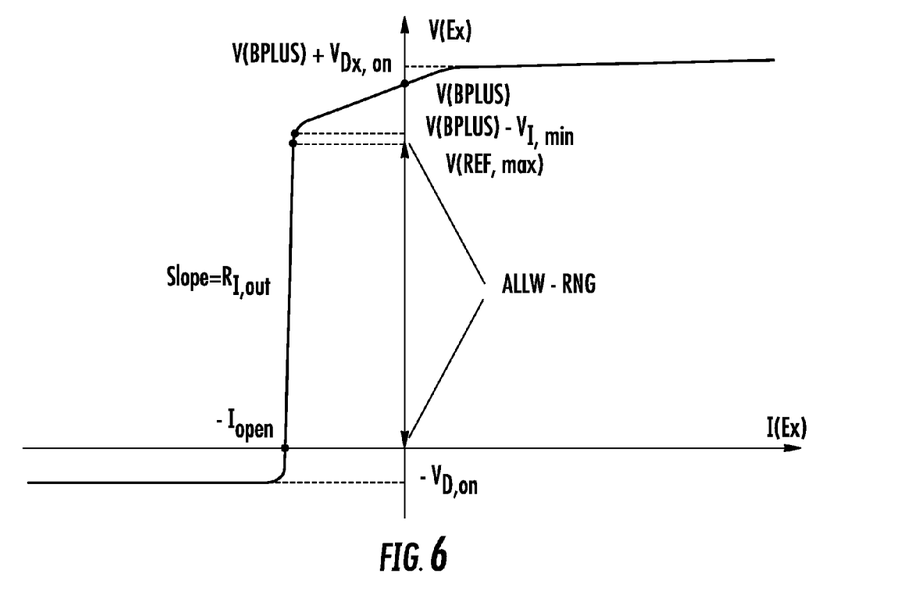
FIG. 6 is a graph of a voltage-current curve of an equivalent circuit with respect to the driving circuit in FIG. 2.
Figure 7:
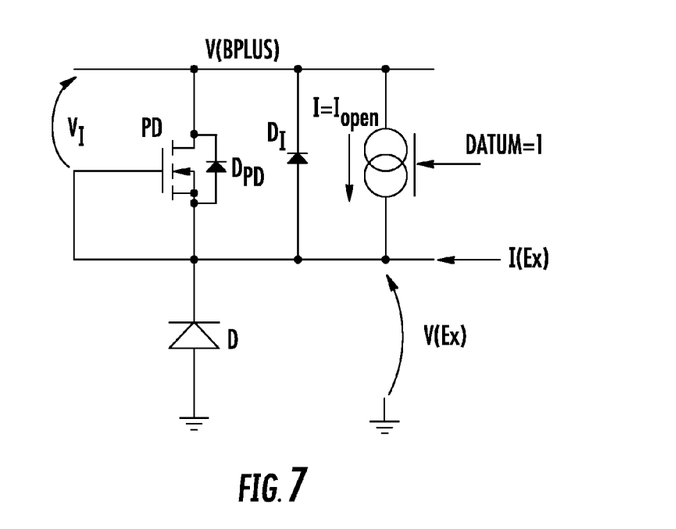
FIG. 7 is a schematic diagram of an equivalent electric circuit corresponding to the curve in FIG. 6.

The graph of FIG. 6 shows the characteristic voltage V(EX) and current I(EX) at node EX of the equivalent circuit in FIG. 7, and shows on that curve, the allowable range Allw-RNG for selecting the reference voltage V(REF). The gradient of the rectilinear tract of the curve in the graph of FIG. 6 is equal to the above defined output resistance $R_{I,out}$.

Figure 8:
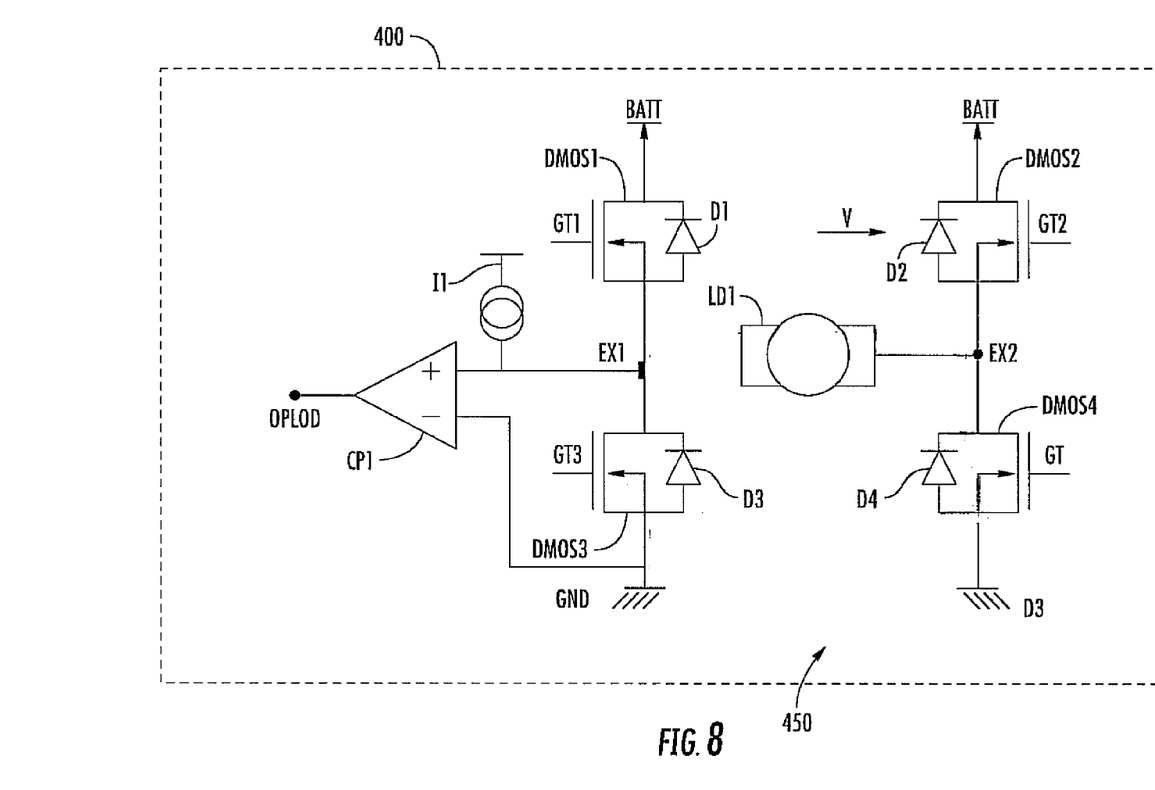
FIG. 8 illustrates another embodiment of the driving circuit in accordance with the present invention.

Referring now to another embodiment, wherein, for example, the load needs a driving, which requires also an inversion of the current direction. FIG. 8 shows a further driving circuit 400, comprising a power device, implemented by a H-bridge circuit 450. According to an example, the driving circuit 400 can be included in the supply system 500 in addition to the driving circuit 100, and it can be managed by the logic block DG-B in FIG. 1

The H-bridge circuit 450 includes a first high transistor DMOS1, coupled between the battery BATT and a first exciting node EX1, and a second high transistor DMOS2, coupled between the battery BATT and a second exciting node EX2. The H-bridge circuit 450 includes a first low transistor DMOS3, connected between the first exciting node EX1 and the ground terminal GND, and a second low transistor DMOS4, connected between the second exciting node EX2 and the ground terminal GND.

To each of the transistors DMOS1, DMOS2, DMOS3, and DMOS4 (as an example of DMOS transistors) of the H-bridge circuit 450, a relative parasitic diode D1, D2, D3, and D4 is associated (connected between the relative source and drain terminals). Each of the transistors DMOS1, DMOS2, DMOS3, and DMOS4 includes a relative gate terminal GT1, GT2, GT3, and GT4.

Between the first exciting node EX1 and the second exciting node EX2, a load LD1 to be driven is connected, such as a motor rotor coil, which can be schematically depicted by a resistor in series with an inductor. For example, with reference to the automotive field, such a further load LD1 to be driven can comprise a motor of a throttle, any DC motor, a motor for Exhaust Gas Recirculation (EGR) valves, any stepper motor, (for example driven by two H-bridge circuits) or also a motor for the driver's compartment ventilation (swirl flap).

Moreover, the further driving circuit 400 includes a diagnostics block, which comprises a further current generator I1, and a further comparator CP1 having an inverting input connected to the ground terminal GND and a non-inverting input connected to the first exciting node EX1. The current generated by the further current generator I1 is equal to a preset current, corresponding to a current involving the further load LD1, in case of an incorrect condition, selected as the reference condition. The further comparator CP1 is configured, for example, to switch when the voltage at the first node EX1 is higher than the ground voltage applied to its inverting terminal.

The H-bridge circuit 450 can be driven in a PWM mode by applying a high-level or low-level voltage to the gate terminals GT1-GT4 of the transistors DMOS1-DMOS4. In case of a PWM signal equal to 1, the first transistor DMOS1 and the fourth transistor DMOS4 result as active (i.e. ON), whereas the second transistor DMOS2 and the third transistor DMOS3 result as inactive (i.e. OFF). The further load LD1 has, at the first node EX1, approximately the same voltage as the battery BATT, and at the second node EX2 approximately the same voltage as the ground terminal GND. In such a condition, if the further load LD1 is correctly connected to the first EX1, the exciting current of the inductor included in such a load LD1 increases.

In another configuration, denoted re-circulating configuration, only the fourth transistor DMOS4 is active and also the presence of the parasitic diode D3 associated with the third transistor DMOS3 is taken into account. If the further load LD1 is correctly connected to the first node EX1, then a current flows in a load LD1 and in the parasitic diode D3, which results in a direct polarization. In such an event the voltage of the first node EX1 decreases, and then no switching occurs at the output of the further comparator CP1. In such an event, the current associated with the further load LD1 is higher than the current generated by the further generator I1.

In case, still in the re-circulating configuration, the further load LD1 happens to be incorrectly connected to the first node EX1, in this load a lower current flows than that generated by the further generator I1. In such a situation, no current flows in the parasitic diode D3, which results in an inverse polarization. Then the voltage at the first node EX1 assumes a higher value than the ground signal value, thereby causing the further comparator CP1 to switch. The (high or low) level assumed by the output diagnostics signal OPLOD to the further comparator CP1 will indicate that the switching occurred. To detect an incorrect connection of the further load to the second node EX2, another comparator and another current generator connected to the second node EX2 may be used, and likewise what disclosed with reference to the first node EX1.

For example, referring again to FIG. 2, it is noted that according to another embodiment, the load LD to be driven can be of the resistive type, and not inductive. In such an event, employing diode D may not be necessary, and it may be omitted. In case of a resistive load correctly connected to the node EX, upon switching off the power transistor PD, a sudden drop of voltage V(EX) will occur (due to the current flowing in the load itself) with respect to the reference voltage V(REF) (determined by taking into account the load resistance), which causes switching to the low level of the control digital signal DAT, which disables the current generator I.

In case of a resistive load incorrectly connected to node EX, upon switching off the power transistor, no drop of voltage V(EX) will occur with respect to the reference voltage V(REF), keeping a high level of the control digital signal DAT, which will maintain the current generator I enabled. Such considerations are valid also for the driving circuit 400 in FIG. 8.

The teachings disclosed can be applied also to other fields, and not only the automotive field. In particular, the diagnostic technique disclosed herein can be applied to driving circuits, wherein the load driving takes place with a frequency (for example up to about 20 KHz) which does not affect the diagnostics itself. The driving circuits described above can also be integrated in a semiconductor chip, such as, for example, a silicon chip.

The embodiments disclosed above have several advantages. In particular, the diagnostics of the conditions of incorrectly connected load is accurate and does not result, in any of disclosed embodiments, in neither an excessive circuit complexity, nor in an excessive increase of leakage.

The embodiments disclosed do not interfere, for example, degrading it, with the normal operation of the driving circuit, and do not provide too restrictive operational restraints for the several circuit blocks used. The possibility of adjusting the value of the current generated by the current generators I and I1 allow accurate defining of the condition of incorrect connection (open state load) taking into account the non-ideal circuit. It is particularly advantageous also that the disclosed circuits may be used also with a duty cycle equal to 100%.

That which is claimed is:

1. A driving circuit comprising:
   a node configured to be coupled to a load;
   a further node configured to be coupled to the load;
   an H-bridge circuit switchable between an activation mode and a deactivation mode and comprising
   a first transistor having a first terminal coupled to said node and to be coupled to the load,
   a second transistor coupled in series with said first transistor and having a second terminal coupled to said node,
   a third transistor having a third terminal coupled to said further node, and
   a fourth transistor coupled in series with said third transistor and having a fourth terminal coupled to said further node;
   a current generator having an output coupled to said node, said current generator being configured to be enabled to generate a current at least when said H-bridge circuit is deactivated; and
   a comparator configured to compare a voltage of said node to a reference voltage and generate a comparison signal based thereon.

2. The driving circuit according to claim 1, further comprising an electronic device coupled to said node and configured to switch between a conduction mode and an interdiction mode based upon transitions of the load between correct connection conditions and incorrect connection conditions.

3. The driving circuit according to claim 2, wherein said electronic device comprises a diode being configured to allow flowing of an electric current when the load is correctly connected and interrupt flowing of the electrical current when the load is incorrectly connected; the voltage of said node varying with transitions of the load between correct connection conditions and incorrect connection conditions.

4. The driving circuit according to claim 1, wherein said current generator is configured to be disabled in a condition of correct connection of the load and configured to be enabled to generate current in a condition of incorrect connection of the load.

5. The driving circuit according to claim 1, wherein said current generator is configured to provide an electric current equal to a current that places the load in a reference condition corresponding to the load being incorrectly connected to said node.

6. The driving circuit according to claim 5, wherein said current generator comprises a control terminal to receive a control digital signal to switch the current generator between current generation enabling and current generation disabling modes.

7. The driving circuit according to claim 1, further comprising a driving controller configured to generate a driving voltage for said power device; and wherein said power device comprises a power transistor having a control terminal coupled to said driving controller.

8. The driving circuit according to claim 1, further comprising an electronic device coupled to said node and configured to switch between a conduction mode and an interdiction mode based upon transitions of the load between correct connection conditions and incorrect connection conditions; and wherein said electronic device comprises a parasitic diode coupled to said second transistor.

9. The driving circuit according to claim 7, wherein said driving controller is configured to generate the driving voltage in accordance with a pulse width modulation (PWM) technique based on a driving enabling signal.

10. The driving circuit according to claim 9, further comprising:
a sequential logic device configured to receive the comparison signal and combine it with the driving enabling signal to obtain a detection signal;
a synchronous memory device configured to acquire and transmit on a respective output, a logical level assumed by the detection signal; and
a logic block configured to command the acquisition and the transmission of the logical level by said synchronous memory device.

11. The driving circuit according to claim 10, wherein said logic block is further configured to:
evaluate a first duty cycle assigned to the driving enabling signal; and
assign to the driving enabling signal, a second duty cycle lower than the first duty cycle if the first duty cycle is equal to 100%.

12. An electrical system comprising:
a load;
a driving circuit coupled to said load and comprising
a node coupled to said load,
a further node coupled to said load;
an H-bridge circuit switchable between an activation mode and a deactivation mode and comprising
a first transistor having a first terminal coupled to said node and said load,
a second transistor coupled in series with said first transistor and having a second terminal coupled to said node,
a third transistor having a third terminal coupled to a further node, and
a fourth transistor coupled in series with said third transistor and having a fourth terminal coupled to said further node,
a current generator having an output coupled to said node, said current generator being configured to be enabled to generate a current at least when said H-bridge circuit is deactivated, and
a comparator configured to compare a voltage of said node to a reference voltage and generate a comparison signal based thereon.

13. The electrical system according to claim 12, wherein said load comprises a coil.

14. The electrical system according to claim 13, further comprising:
a battery; and
an alternator configured to charge said battery;
said alternator comprising a rotor coupled to said coil.

15. The electrical system according to claim 14, further comprising:
a management block coupled to said driving circuit and configured to generate a command signal based upon a detection of an anomalous connection condition of said load; and
a signalling device configured to indicate an anomaly based upon the command signal.

16. A method of using a driving circuit comprising:
enabling a current generator to generate a current at an output coupled to a node when an H-bridge circuit switchable between an activation mode and a deactivation mode is deactivated, the H-bridge circuit comprising
a first transistor having a first terminal coupled to the node and a load,
a second transistor coupled in series with the first transistor and having a second terminal coupled to the node,
a third transistor having a third terminal coupled to a further node to be coupled to the load, and
a fourth transistor coupled in series with the third transistor and having a fourth terminal coupled to the further node;
comparing a voltage at the node to a reference voltage; and
generating a comparison signal based upon the comparison.

17. The method according to claim 16, further comprising configuring an electronic device coupled to the node to switch between a conduction mode and an interdiction mode based upon transitions of the load between correct connection conditions and incorrect connection conditions.

18. The method according to claim 17, wherein configuring the electronic device comprises configuring a diode coupled to the node to allow flowing of an electric current when the load is correctly connected and interrupt flowing of the electrical current when the load is incorrectly connected.

19. A driving circuit comprising:
a node configured to be coupled to a load to be driven;
a power device switchable between an activation mode and a deactivation mode and coupled to said node, said power device comprising a power transistor having a control terminal;
a current generator having an output coupled to said node, said current generator being configured to be enabled to generate a current at least when said power device is deactivated;
a comparator configured to compare a voltage of said node to a reference voltage and generate a comparison signal based thereon; and
a driving controller coupled to said control terminal and configured to generate a driving voltage for said power device in accordance with a pulse width modulation (PWM) technique based on a driving enabling signal.

20. The driving circuit according to claim 19, further comprising an electronic device coupled to said node and configured to switch between a conduction mode and an interdiction mode based upon transitions of the load between correct connection conditions and incorrect connection conditions.

21. The driving circuit according to claim 20, wherein said electronic device comprises a diode being configured to allow flowing of an electric current when the load is correctly connected and interrupt flowing of the electrical current when the load is incorrectly connected; the voltage of said node varying with transitions of the load between correct connection conditions and incorrect connection conditions.

22. The driving circuit according to claim 19, wherein said current generator is configured to be disabled in a condition of correct connection of the load and configured to be enabled to generate current in a condition of incorrect connection of the load.

23. The driving circuit according to claim 19, wherein said current generator is configured to provide an electric current equal to a current that places the load in a reference condition corresponding to the load being incorrectly connected to said node.

24. The driving circuit according to claim 23, wherein said current generator comprises a control terminal to receive a control digital signal to switch the current generator between current generation enabling and current generation disabling modes.

25. The driving circuit according to claim 19, wherein said power device comprises an H-bridge circuit comprising:
    a first transistor including a first terminal coupled to said node and configured to be coupled to a first driving terminal of the load;
    a second transistor coupled in series with said first transistor and having a second terminal coupled to said node;
    a third transistor having a third terminal coupled to a further node, the further node being configured to be coupled to a second supplying node of the load; and
    a fourth transistor coupled in series with said third transistor and having a fourth terminal coupled to said further node.

26. The driving circuit according to claim 25, further comprising an electronic device coupled to said node and configured to switch between a conduction mode and an interdiction mode based upon transitions of the load between correct connection conditions and incorrect connection conditions; and wherein said electronic device comprises a parasitic diode coupled to said second transistor.

27. The driving circuit according to claim 19, further comprising:
    a sequential logic device configured to receive the comparison signal and combine it with the driving enabling signal to obtain a detection signal;
    a synchronous memory device configured to acquire and transmit on a respective output, a logical level assumed by the detection signal; and
    a logic block configured to command the acquisition and the transmission of the logical level by said synchronous memory device.

28. The driving circuit according to claim 27, wherein said logic block is further configured to:
    evaluate a first duty cycle assigned to the driving enabling signal; and
    assign to the driving enabling signal, a second duty cycle lower than the first duty cycle if the first duty cycle is equal to 100%.

29. A method of using a driving circuit comprising:
    enabling a current generator to generate a current at a node when a power device switchable between an activation mode and a deactivation mode is deactivated, the power device comprising a power transistor having a control terminal;
    comparing a voltage at the node to a reference voltage;
    generating a comparison signal based upon the comparison; and
    generating a driving voltage for the power device using a driving controller coupled to the control terminal, the driving voltage being generated in accordance with a pulse width modulation (PWM) technique based on a driving enabling signal.

30. The method according to claim 29, further comprising configuring an electronic device coupled to the node to switch between a conduction mode and an interdiction mode based upon transitions of the load between correct connection conditions and incorrect connection conditions.

31. The method according to claim 30, wherein configuring the electronic device comprises configuring a diode coupled to the node to allow flowing of an electric current when the load is correctly connected and interrupt flowing of the electrical current when the load is incorrectly connected.

32. The method according to claim 29, wherein the power device comprises an H-bridge circuit comprising:
    a first transistor coupled to the node and configured to be coupled to the load;
    a second transistor coupled in series with the first transistor and coupled to the node;
    a third transistor coupled to a further node, the further node being configured to be coupled to a second supplying node of the load; and
    a fourth transistor coupled in series with the third transistor and coupled to the further node.

* * * * *